(12) United States Patent
Nobe et al.

(10) Patent No.: US 7,667,361 B2
(45) Date of Patent: Feb. 23, 2010

(54) ELECTRIC MOTOR AND ELECTRONIC APPARATUS

(75) Inventors: Tetsuya Nobe, Chiba (JP); Takayuki Satodate, Chiba (JP); Ayako Inoue, Chiba (JP); Akihiro Iino, Chiba (JP)

(73) Assignee: Seiko Instruments Inc. (JP)

( * ) Notice: Subject to any disclaimer, the term of this patent is extended or adjusted under 35 U.S.C. 154(b) by 31 days.

(21) Appl. No.: 11/820,932

(22) Filed: Jun. 21, 2007

(65) Prior Publication Data

US 2007/0296294 A1 Dec. 27, 2007

(30) Foreign Application Priority Data

Jun. 23, 2006 (JP) .............................. 2006-173389

(51) Int. Cl.
*H02K 5/16* (2006.01)
(52) U.S. Cl. .................. 310/90; 310/67 R; 310/91; 310/156.66
(58) Field of Classification Search ............... 310/67 R, 310/90, 91, 156.66
See application file for complete search history.

(56) References Cited

U.S. PATENT DOCUMENTS

| | | | | |
|---|---|---|---|---|
| 3,737,987 | A | * | 6/1973 | Bednarski ..................... 29/596 |
| 4,471,246 | A | * | 9/1984 | Paillet ......................... 310/90 |
| 4,841,183 | A | * | 6/1989 | Dohogne et al. .............. 310/90 |
| 5,677,584 | A | * | 10/1997 | Keck ............................ 310/90 |
| 6,250,808 | B1 | * | 6/2001 | Ichiyama ..................... 384/100 |
| 6,917,130 | B2 | * | 7/2005 | Aiello et al. ................ 310/90.5 |
| 2002/0093262 | A1 | * | 7/2002 | Zepp et al. ..................... 310/90 |
| 2003/0025409 | A1 | * | 2/2003 | Liu et al. ....................... 310/90 |
| 2005/0062351 | A1 | * | 3/2005 | Berwert et al. ................ 310/90 |
| 2005/0068667 | A1 | * | 3/2005 | Burns et al. .............. 360/99.08 |
| 2005/0093386 | A1 | * | 5/2005 | Kim ............................. 310/90 |
| 2005/0207026 | A1 | * | 9/2005 | Satodate et al. ............. 359/696 |
| 2006/0181168 | A1 | * | 8/2006 | Hargraves et al. ............. 310/90 |

FOREIGN PATENT DOCUMENTS

| | | |
|---|---|---|
| JP | 2000004570 | 1/2000 |
| JP | 2002199671 | 7/2002 |

* cited by examiner

*Primary Examiner*—Quyen Leung
*Assistant Examiner*—John K Kim
(74) *Attorney, Agent, or Firm*—Adams & Wilks

(57) ABSTRACT

An electric motor has a rotor having an end portion and a recessed portion formed at the end portion. A rotational shaft is mounted to the rotor. A stator covers an outer peripheral portion of the rotor and forms a magnetic field that generates a torque around the rotational shaft to thereby rotate the rotational shaft and the rotor. A bearing rotatably supports the rotational shaft and is entirely spaced-apart from the end portion of the rotor in an axial direction of the rotational shaft. A slider is slidably mounted around the rotational shaft and supports rotation of the rotational shaft about a rotational axis thereof. The slider is interposed between the bearing and the rotor so that a portion of the slider is entirely contained in the recessed portion of the rotor and the remaining portion of the slider is disposed in the space between the bearing and the rotor and in contact with the bearing.

20 Claims, 9 Drawing Sheets

ELECTRIC MOTOR AND ELECTRONIC APPARATUS

BACKGROUND OF THE INVENTION

1. Field of the Invention

The present invention relates to an electric motor of a stepping motor or a brushless motor or the like used for a drive source or the like of an electronic apparatus of a digital camera or a camera attached portable telephone, and an electronic apparatus having the electric motor.

2. Description of the Related Art

In a related art, an electric motor of a stepping motor or a brushless motor or the like is mounted to various electronic apparatus as a drive source or the like. For example, a stepping motor is excellent in terms of compatibility with a digital control system and, in recent times, has been frequently utilized as the drive source for driving a lens for focusing or zooming in an electronic apparatus of a digital camera or a camera attached portable telephone or the like. In recent years, further promotion of small-sized formation and reliability has been achieved for an electric motor mounted to an electronic apparatus in accordance with small-sized formation and precision formation of an electronic apparatus.

For example, there is proposed a stepping motor including a rotor having a rotating shaft, a stator covering the rotor, and a bearing fixed to a bearing frame portion provided at the stator for axially supporting rotatably the rotating shaft of the rotor and provided with a slider between the bearing and the rotor (refer to, for example, Patent Reference 1). According to the stepping motor, by using a washer having a projected portion brought into contact with the bearing frame portion as the slider, a friction load generated in accordance with rotation is reduced and wear of the rotor is prevented, and thrust rattle can be restrained from being brought about.

Further, as another example, there is proposed a stepping motor in which a rotor is constituted by a magnet in a cylindrical shape, and a molded member comprising a thermosetting resin for coupling the magnet and a rotating shaft and an end face thereof is provided with a heat resistant sliding member integrally molded with the magnet and the molded member (refer to, for example, Patent Reference 2) According to the stepping motor, by integrally molding the sliding member with the molded member of the rotor, resin burr can be reduced in being molded while functioning as the slider.

Patent Reference 1: JP-A-2000-4570
Patent Reference 2: JP-A-2002-199671

However, according to Patent Reference 1, in order to ensure a member dimension necessary for functioning as the slider, a space in correspondence therewith is needed between the bearing and the rotor. Therefore, there is a limit in achieving small-sized formation of a total of the electric motor in an axis line direction of the rotating shaft. Although it is also conceivable to reduce a member dimension of the slider or the bearing in order to achieve small-sized formation in the axis line direction, there is a concern of reducing a durability by reducing a strength thereof, or detaching the member from the rotating shaft in being impacted in being dropped or the like, and there is a limit in reducing the member dimension. Further, when the member dimension is reduced, a workable material is limited, and material cost, working cost are increased.

Further, since the space of providing the slider is needed as described above, a dimension in the axis line direction of the rotor is reduced relative to the stator. Therefore, a torque cannot efficiently be operated to the rotor by a magnetic field formed by the stator. Particularly, since there is a limit in reducing the member dimension of the slider as described above, the more small-sized is the total of the electric motor, the more reduced is the rate of the dimension in the axis line direction of the rotor relative to the stator to pose a problem of being inefficient.

Further, according to Patent Reference 2, the slider is rotated integrally with the magnet and the molded member constituting the rotor. Therefore, an effect of reducing a friction load generated between the bearing and the rotor is reduced as the slider. Further, it is necessary to reduce the bearing more than a diameter dimension of the slider so as not to be brought into contact with the molded member exposed at a surrounding of the slider in order to prevent a reduction in the torque by the friction load, and the slider is brought in to contact with a total of the bearing. Therefore, a reduction in the friction load cannot be achieved efficiently in the above-described constitution.

SUMMARY OF THE INVENTION

The invention is carried out in view of the above-described situation by providing an electric motor for efficiently operating a torque to a rotor by a stator while preventing an increase in a friction load by a slider, and that is capable of achieving a small-sized apparatus in an axis line direction of a rotational shaft of the rotor.

In order to resolve the above-described problem, the invention proposes the following means.

The invention provides an electric motor comprising a rotor substantially in a cylindrical shape, a rotating shaft provided at a center of rotation of the rotor, a stator having a yoke covering an outer peripheral portion of the rotor and capable of operating a torque around the rotating shaft to the rotor by forming a magnetic field, a bearing fixed by the stator by a support member for rotatably supporting the rotating shaft, and a slider substantially in a plate-like shape interposed between the bearing and an end portion of the rotor, wherein the end portion of the rotor is formed with a first recessed portion for containing at least a portion of the slider in an axis line direction of the rotating shaft slidably around the rotating shaft.

According to the electric motor according to the invention, by interposing the slider slidably between the rotor and the bearing, the rotor can be rotated by reducing a friction load. Further, by containing the slider in the first containing recessed portion, in accordance with a dimension of the first containing recessed portion, a necessary member dimension of the slider is ensured in the axis line direction, and a space between the bearing and the end portion of the rotor can be constituted by a minimum size. Therefore, the torque can efficiently be operated to the rotor by a magnetic field formed by the yoke of the stator, further, a dimension in the axis line direction of a total of the apparatus can be constituted by a minimum size.

Further, in the above-described electric motor, it is further preferable to include a second recessed portion formed at a bottom portion of the first recessed portion for forming a space between the slider contained in the first recessed portion and the rotor.

According to the electric motor according to the invention, by the second recessed portion, the space is formed between the slider contained in the first recessed portion and the rotor. Therefore, a contact area of the slider and the rotor can be reduced, the second recessed portion is made to function as a storage of a lubricant for making the slider and the rotor smoothly slidable and the friction load can further be reduced. Further, when the rotor and the rotating shaft are adhered to be fixed, even when an adhering agent is assumedly leaked to the end portion side of the rotor, the adhering agent is contained in the second recessed portion, and therefore, the adhering agent is interposed between the slider and the rotor and thrust rattle can be prevented from being brought about. Further, an inertia moment of a total of the rotor can be reduced, and therefore, the motor torque can further efficiently be outputted by the torque operated by the stator.

Further, in the above-described electric motor, it is further preferable that the end portion of the rotor is formed with a third recessed portion for containing at least a portion of the bearing in the axis line direction with a clearance therebetween, and the first recessed portion is formed at a bottom portion of the third recessed portion.

According to the electric motor according to the invention, by containing a portion of the bearing in the third recessed portion, the bearing and the slider are brought into contact with each other at inside of the third recessed portion. Therefore, the dimension in the axis line direction of the rotor can be determined without being restricted by member dimensions of the bearing and the slider. That is, a space for providing the slider between the bearing and the end portion of the rotor is substantially dispensed with, further, also a clearance between the support member for supporting the bearing and the end portion of the rotor can be made to be as small as possible. Further, the bearing is not projected to an outer side in the axial direction of the support member. Therefore, the small-sized formation of the total of the apparatus in the axis line direction can further be achieved, and the torque can efficiently be operated by the rotor. Further, the inertia moment of the rotor can further be reduced and the rotor can further efficiently be rotated.

Further, in the above-described electric motor, it is further preferable that the first recessed portion is contained with a plurality of the sliders in the axis line direction.

According to the electric motor of the invention, the respective sliders are slid around the rotating shaft respectively independently from each other between the bearing and the rotor. Therefore, a friction load can further be reduced, stick slip among the slider, the bearing, the rotor can be restrained from being brought about, which amounts to not only a reduction in a variation of the torque but also a reduction in an error of a stopping position. Further, according to the sliders, the electric motor is not large-sized in the axis line direction by making the sliders plural by being contained in the first recessed portion.

Further, in the above-described electric motor, it is further preferable that the rotor includes a magnet formed by a ferromagnetic material and magnetized in multipoles in a circumferential direction at the outer peripheral portion, and the electric motor is a stepping motor capable of rotating the rotor intermittently by the rotor and the stator.

According to the electric motor according to the invention, an increase in the motor torque can be achieved by operating the torque efficiently to the rotor, and therefore, a small-sized high output stepping motor can be realized. Further, by constituting the magnet of the rotor by the magnet magnetized in multipoles in the circumferential direction, an increase in the motor torque can further be achieved by increasing a magnetic flux intensity.

Further, in the above-described electric motor, it is further preferable that the magnet of the rotor is magnetized in multipoles by magnetizing the magnet by alternately aligning magnetizing yokes having different magnetic poles only in the circumferential direction to surround the outer peripheral portion.

According to the electric motor according to the invention, the magnet of the rotor is magnetized by alternately aligning the magnetizing yokes having the different magnetic poles to surround the outer peripheral portion and it is not necessary to magnetize the magnet by arranging the magnetizing yoke on an inner side of the rotor. Therefore, small-sized formation in the diameter direction of the rotor can be achieved without needing a space for providing the magnetizing yoke at inside of the rotor. Further, by arranging only at the outer peripheral portion, a number of the magnetizing yokes can be arranged to be able to achieve an output having a higher resolution by forming a number of the magnetic poles. Further, a portion of the rotor which is magnetized is an outer peripheral portion and a center portion thereof is not magnetized. Therefore, even when the first recessed portion is formed, a magnetic force of the rotor is not reduced.

Further, in the above-described electric motor, it is further preferable that the stator is provided with a plurality of the yokes to be aligned in the axis line direction.

According to the electric motor according to the invention, the output having the high resolution can be achieved by the plurality of yokes.

Further, in the above-described electric motor, it is further preferable that the yoke of the stator is constituted by arranging a plurality of magnetic pole teeth aligned in the axis line direction and capable of forming a magnetic field in the circumferential direction, and the rotor is provided to be opposed to the magnetic pole teeth in a range of arranging at least the magnetic pole teeth in the axis line direction.

According to the electric motor according to the invention, by providing the rotor in the range of arranging the magnetic pole teeth in the axis line direction, the torque can be operated efficiently to the rotor by the magnetic field formed by the magnetic pole teeth of the yoke. Further, when the stator is constituted by a plurality of the yokes, by providing the rotor in the range of arranging the magnetic pole teeth in the yoke arranged on the end portion side of the rotor, the torque can uniformly be operated by any of the yokes. Therefore, the detent torque can be reduced and an increase in the motor torque, low vibration, low noise formation can be achieved.

Further, in the above-described electric motor, it is further preferable that the rotor is provided to be opposed to the yoke in a range in the axis line direction provided with the yoke.

According to the electric motor according to the invention, by providing the rotor in the range of providing the yoke in the axis line direction, the torque can efficiently be operated to the rotor. Further, when the stator is constituted by a plurality of the yokes, the detent torque can further be reduced, the increase in the motor torque, the low vibration, the low noise formation can further be achieved.

Further, an electronic apparatus of the invention comprises the above-described electric motor.

According to the electronic apparatus according to the invention, by providing the electric motor, small-sized formation can be achieved and the electronic apparatus can be driven by a high output.

Further, the electronic apparatus of the invention comprises the electric motor, a lens member arranged movably along an optical axis, lens driving means for moving the lens member along the optical axis in accordance with rotation of the rotor of the electric motor, and a camera module having an image taking element arranged on the optical axis.

According to the electronic apparatus according to the invention, when the rotor is rotated, the lens driving means is operated to freely move the lens member along the optical axis. Thereby, a distance between the image taking element and the lens member arranged on the optical axis can arbitrarily be adjusted. Thereby, the image can be taken while carrying out focusing, zooming or the like. Particularly, by providing the above-described electric motor, high output formation and small-sized formation of a total of the apparatus can be achieved. Further, when the stator is constituted by a plurality of the yokes, an output having a high resolution can be achieved and the detent torque can further be reduced. Therefore, focusing, zooming or the like can be operated to be still and smooth and by the high output.

According to the electric motor of the invention, by forming the first recessed portion to the rotor, the torque is efficiently operated to the rotor by the stator while preventing an increase in the friction load and small-sized formation of the total of the apparatus in the axis line direction can be achieved.

Further, according to the electronic apparatus of the invention, by providing the above-described electric motor, small-sized formation of the total of the apparatus is achieved and the electronic apparatus can efficiently be driven by the high output.

DETAILED DESCRIPTION OF THE PREFERRED EMBODIMENTS

First Embodiment

Figure 1:
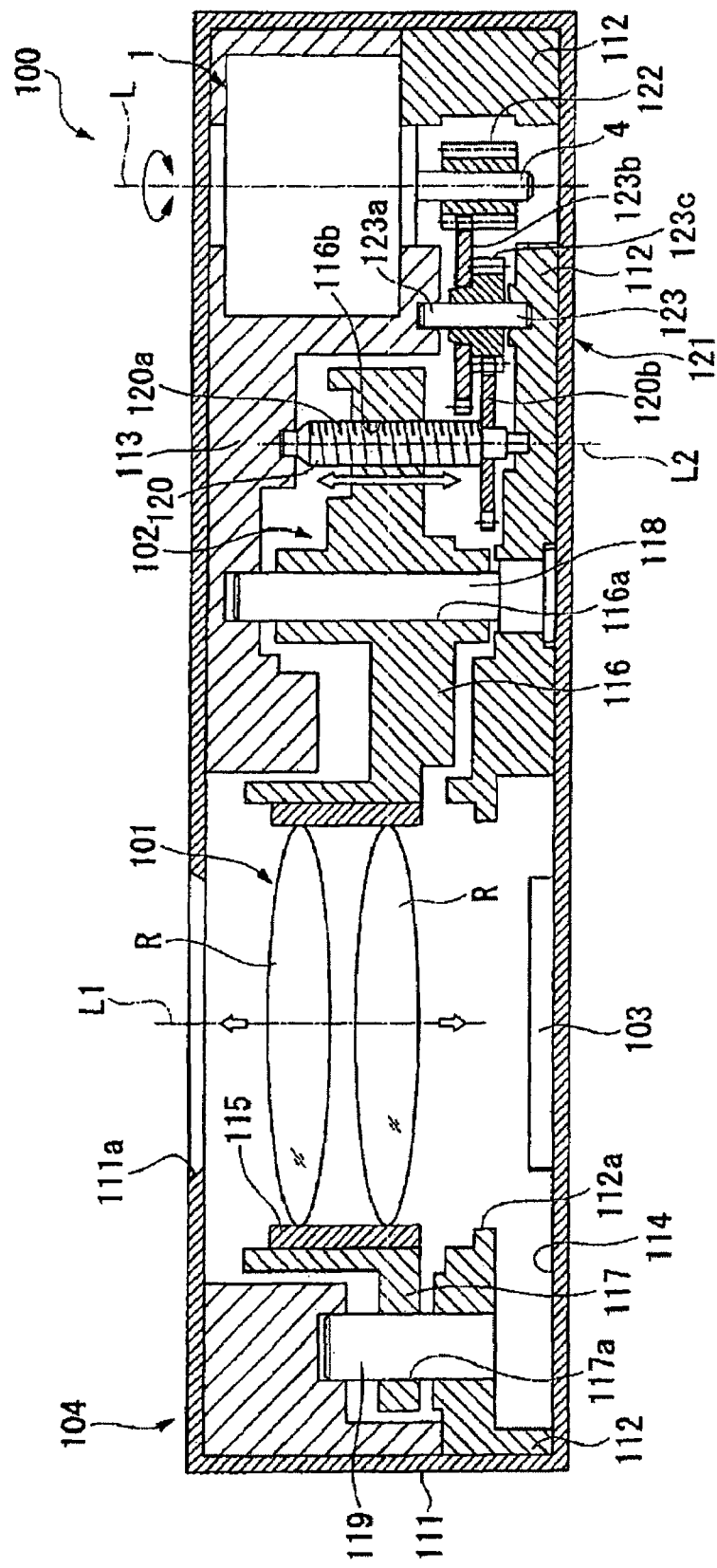
FIG. 1 is a sectional view of an electronic apparatus according to a first embodiment of the invention.

FIGS. 1-5 show a first embodiment according to the invention. As shown by FIG. 1, a camera attached portable telephone 100 constituting an electronic apparatus of the embodiment includes a stepping motor 1 constituting an electric motor as a drive source, a lens member 101 arranged movably along an optical axis L1, lens driving means 102 for moving the lens member 101 along the optical axis L1 in accordance with rotation of a rotor 3 mentioned later of the stepping motor 1, and a camera module 104 including an image taking element 103 arranged on the optical axis L1. Further, the respective mechanisms and members are contained at inside by a casing 111. The stepping motor 1 is a motor capable of being driven to rotate intermittently and is fixed by a first support member 112 and a second support member 113 fixed to the casing 111. Further, details of an inner structure of the stepping motor 1 will be described later.

A back face of the casing 111 is attached with a circuit board 114 mounted with a control portion, a motor driver and a signal processing portion and the image taking element 103. The image taking element 103 is a semiconductor device of, for example, CCD, CMOS or the like and is contained in a recessed portion 112a of the first support member 112. Further, the control portion includes CPU, a memory or the like for controlling operation of the image taking element 103 and generally controlling a total of the camera module 104. The motor driver supplies currents respectively to wiring terminals of respective exciting coils 22 mentioned later of the stepping motor 1. The signal processing portion processes a signal outputted from the image taking element 103 to be outputted to the control portion.

The lens member 101 is arranged on an upper side of the image taking element 103. The lens member 101 is constituted by a lens holder portion 115 in a cylindrical shape, a single or a plurality of lenses R fixed to an inner peripheral face of the lens holder portion 115. A position of installing the image taking element 103 is adjusted to be arranged on the optical axis L1 of the lenses R. Further, a light taking hole 111a is formed at a portion of the casing 111 disposed on the optical axis L1 of the lens R to be opposed to the lens R and the image taking element 103.

Further, an outer periphery of the lens holder portion 115 is provided with a pair of expanded members 116, 117 to be opposed to each other by interposing the optical axis L1 therebetween. The pair of expanded members 116, 117 are respectively formed with guide holes 116a, 117a of through holes or grooves capable of inserting a pair of guide shafts 118, 119. The pair of guide shafts 118, 119 are, for example, round bars arranged in parallel with the optical axis L1 at positions interposing the lens member 101 therebetween, and both ends thereof are fixed by the first support member 112 and the second support member 113. That is, the lens member 101 is included in an inner space of the casing 111 in a state of being supported by the pair of guide shafts 118, 119 and arranged between the image taking element 103 and the light taking hole 111a. Further, the pair of guide shafts 118, 119 are slidably set by the pair of guide holes 116a, 117a. Thereby, the plurality of lenses R are made to be movable in a direction of the optical axis L1 along the pair of guide shafts 118, 119.

Further, the expanded member 116 on one side of the pair of the expanded members 116, 117 is formed to extend in a direction of being remote from the lens member 101 and a front end thereof includes a nut portion 116b screwed with a screw portion 120a of a feed screw shaft 120. The feed screw shaft 120 is arranged similarly in parallel with the optical axis L1 at a position contiguous to the guide shaft 118 on one side in the pair of guide shafts 118, 119. Further, both ends of the feed screw shaft 120 are rotatably fixed respectively to the first support member 112 and the second support member 113. Thereby, the feed screw shaft 120 can be rotated around an axis line L2 in parallel with the optical axis L1.

Further, a side of the first support member 112 of the feed screw shaft 120 is provided with a driven gear 120b outwardly fitted to the feed screw shaft 120 and rotatable integrally therewith, and the screw portion 120a having a screw groove at an outer peripheral face thereof is formed at a portion on a side of the second support member 113 of the driven gear 120b. Further, as described above, the nut portion 116b of the expanded member 116 on one side is screwed to the screw portion 120a. At this occasion, since the lens member 101 is supported by the pair of guide shafts 118, 119, when the feed screw shaft 120 is rotated around the axis line L2, the nut portion 116b can be moved in a direction of the axis line L2 without being rotated by being driven by the feed screw shaft 120, that is, a rotational movement of the feed screw shaft 120 can be converted into a linear movement of the lens R.

Further, the driven gear 120b of the feed screw shaft 120 is connected to a rotating shaft 4 of the stepping motor 1 by way of a transmission mechanism 121, and can be rotated around the axis line L2 in accordance with rotation of the rotating shaft 4. Specifically explaining, the transmission mechanism 121 includes a drive gear 122 outwardly fitted to the rotating shaft 4 of the stepping motor 1 rotatably along therewith, and a middle gear 123. The middle gear 123 includes a shaft member 123a rotatably supported by the first support member 112 and the second support member 113, and an input gear 123b and an output gear 123c outwardly fitted to the shaft member 123a and rotatable coaxially therewith. The drive gear 122 is brought in mesh with the input gear 123b. The output gear 123c is brought in mesh with the driven gear 120b. The output gear 123c is set with an outer diameter smaller than that of the input gear 123b and a number of teeth smaller than that of the input gear 123a. Thereby, a rotational force of the rotating shaft 4 of the stepping motor 1 is transmitted to the feed screw shaft 120 after reducing a speed thereof by the input gear 123b and the output gear 123c of the middle gear 123. Further, there may be constructed a constitution of reducing the speed by a plurality of stages by further providing a plurality of middle gears. Further, the above-described lens driving means 102 for moving the lens member 101 in accordance with rotation of the rotor 3 and the rotating shaft 4 is constituted by the nut portion 116b, the feed screw shaft 120 and the transmission mechanism 121.

Figure 2:
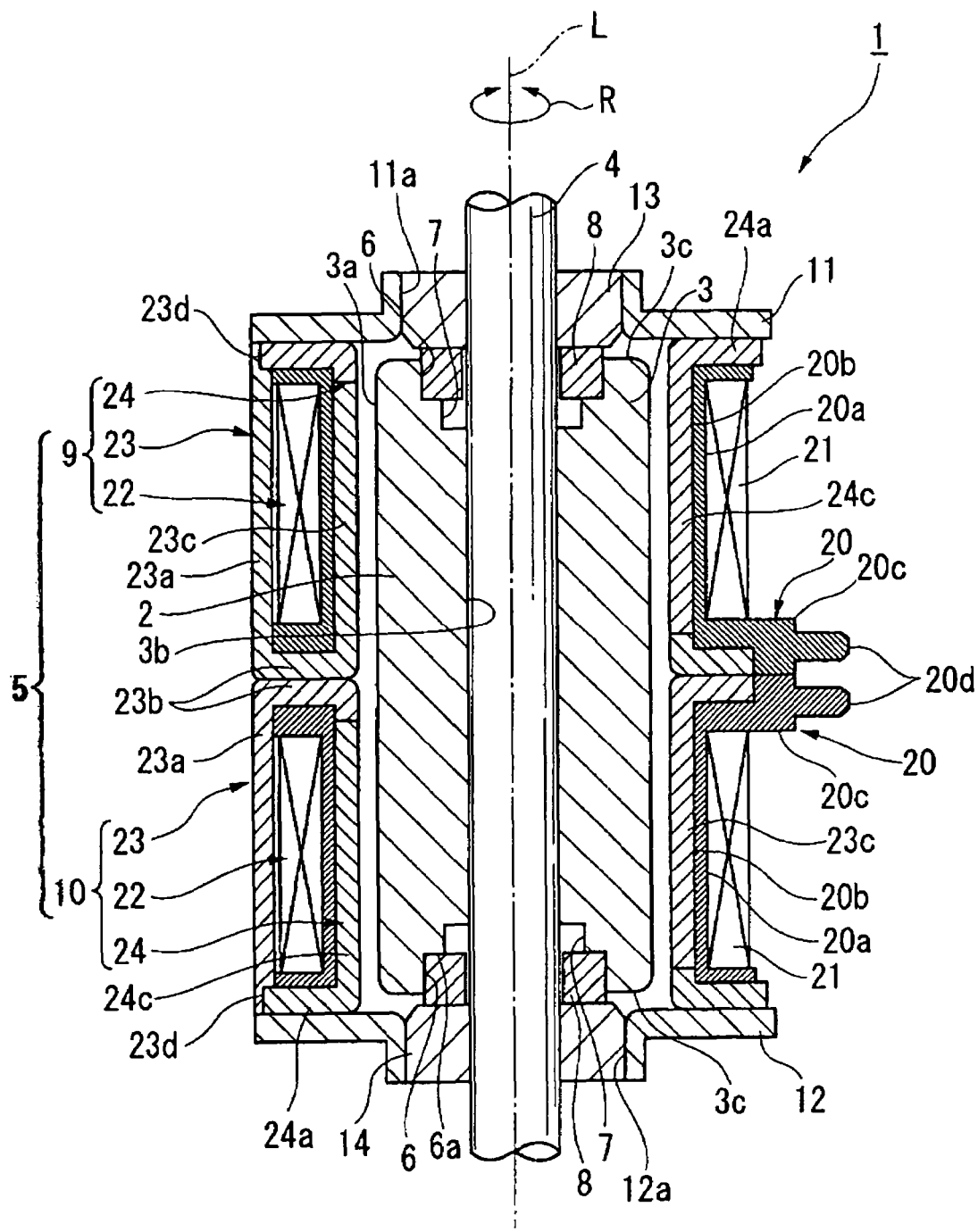
FIG. 2 is a sectional view of a stepping motor according to the first embodiment of the invention.
Figure 3:
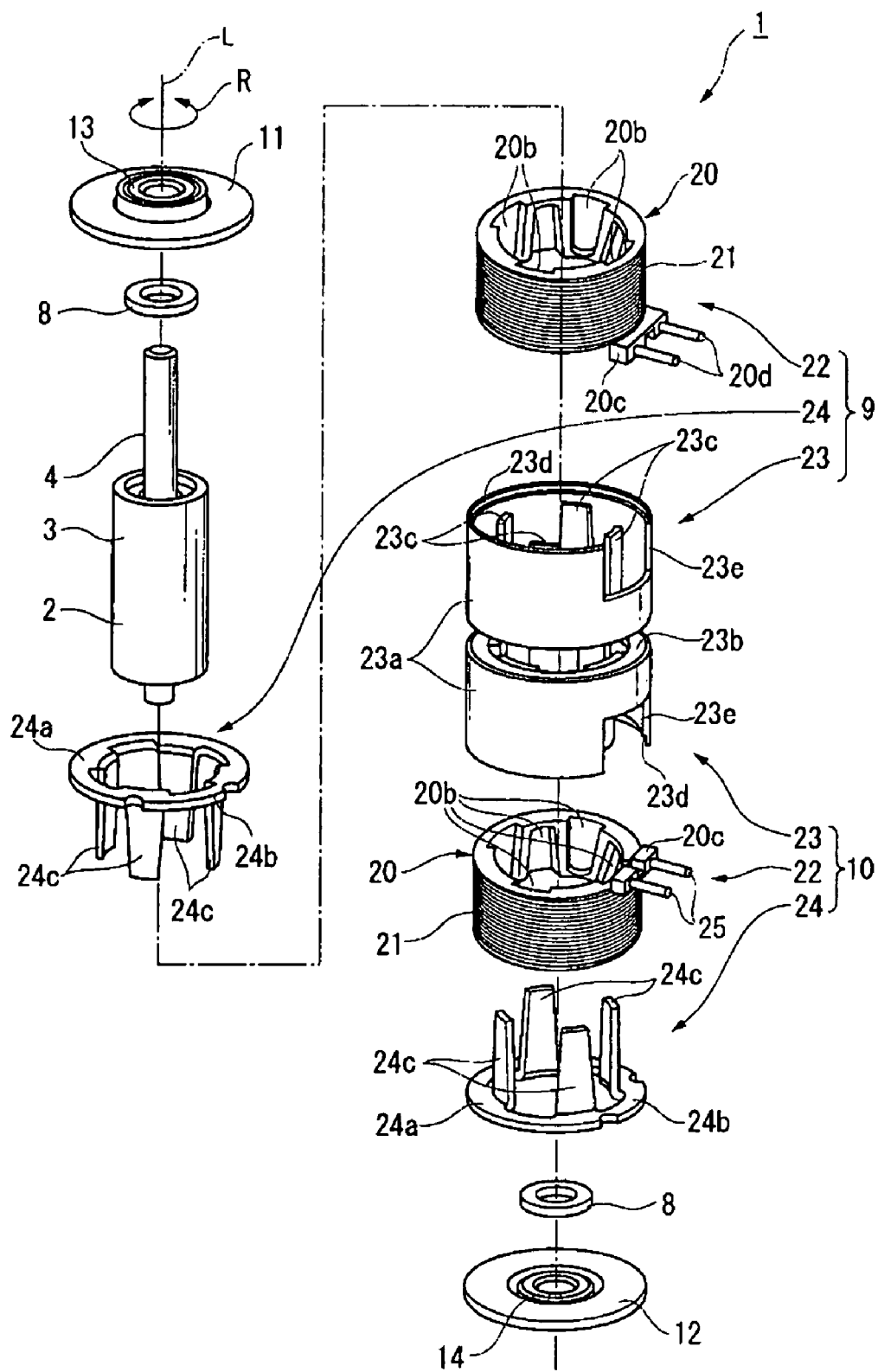
FIG. 3 is a disassembled perspective view of the stepping motor according to the first embodiment of the invention.

Next, an explanation will be given of details of a structure of an inner portion of the stepping motor 1 constituting a drive source for moving the lens member 101 by the lens driving means 102. As shown in FIG. 2 and FIG. 3, the stepping motor 1 includes the rotor 3 having a permanent magnet (magnet) 2 in a cylindrical shape and magnetized in multipoles in a circumferential direction R of an outer peripheral portion 3a, the rotating (rotational) shaft 4 inserted through a through hole 3b formed at a center of rotation of the rotor 3, and a stator 5 for covering the outer peripheral portion 3a of the rotor 3.

The rotor 3 and the rotating shaft 4 are fixed by, for example, interposing an adhering agent therebetween. Both end portions 3c of the rotor 3 are formed with first recessed portions 6 coaxial with the through hole 3b and having an inner diameter larger than the through hole 3b. Further, a bottom portion 6a of the first recessed portion 6 is formed with a second recessed portion 7 having an inner diameter smaller than the first recessed portion 6 and larger than the through hole 3b. Further, the first recessed portion 6 is contained with a slider 8 substantially in a circular plate shape in a state of being inserted with the rotating shaft 4 and slidable around the axis line L at inside of the first recessed portion 6. Further, a material constituted by a nonmagnetic member of a resin or the like, excellent in wear resistance and having a low friction coefficient is preferable for the slider 8, for example, polyacetal, nylon, fluororesin or the like is selected therefor. Further, a lubricant is filled between the slider 8 and the rotor 3 to be made to be slidable further smoothly. Further, a dimension in the axis line L direction of the slider 8 is set to be slightly larger than a depth of the first recessed portion 6 so that a portion thereof is contained in the first recessed portion 6 and another portion thereof is extended from the end portion 3c of the rotor 3. Further, in a state of containing the slider 8 in the first recessed portion 6, a space is formed between the rotor 3 and the slider 8 to be brought into a state of filling the lubricant mentioned above.

Figure 4:
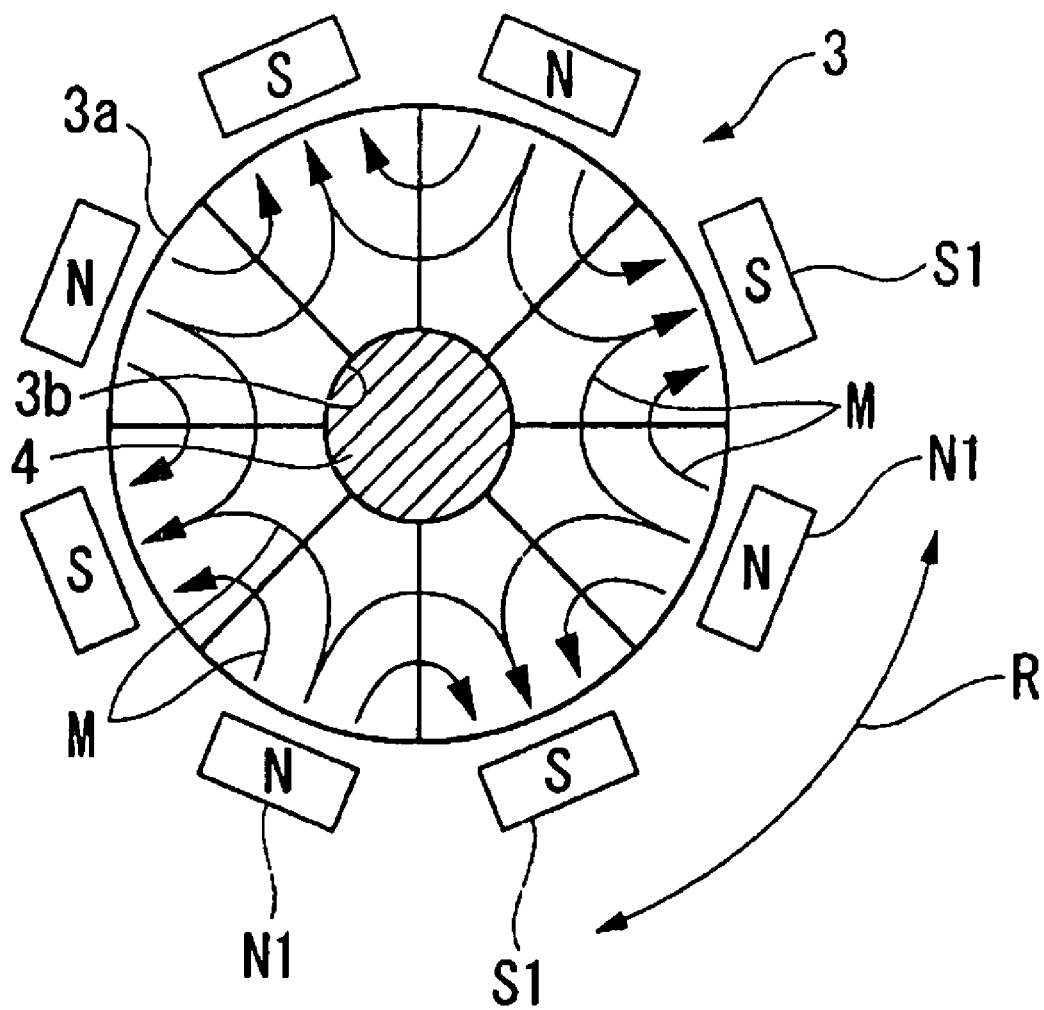
FIG. 4 is an explanatory view of a method of magnetizing a rotor according to the first embodiment of the invention.
Figure 5:
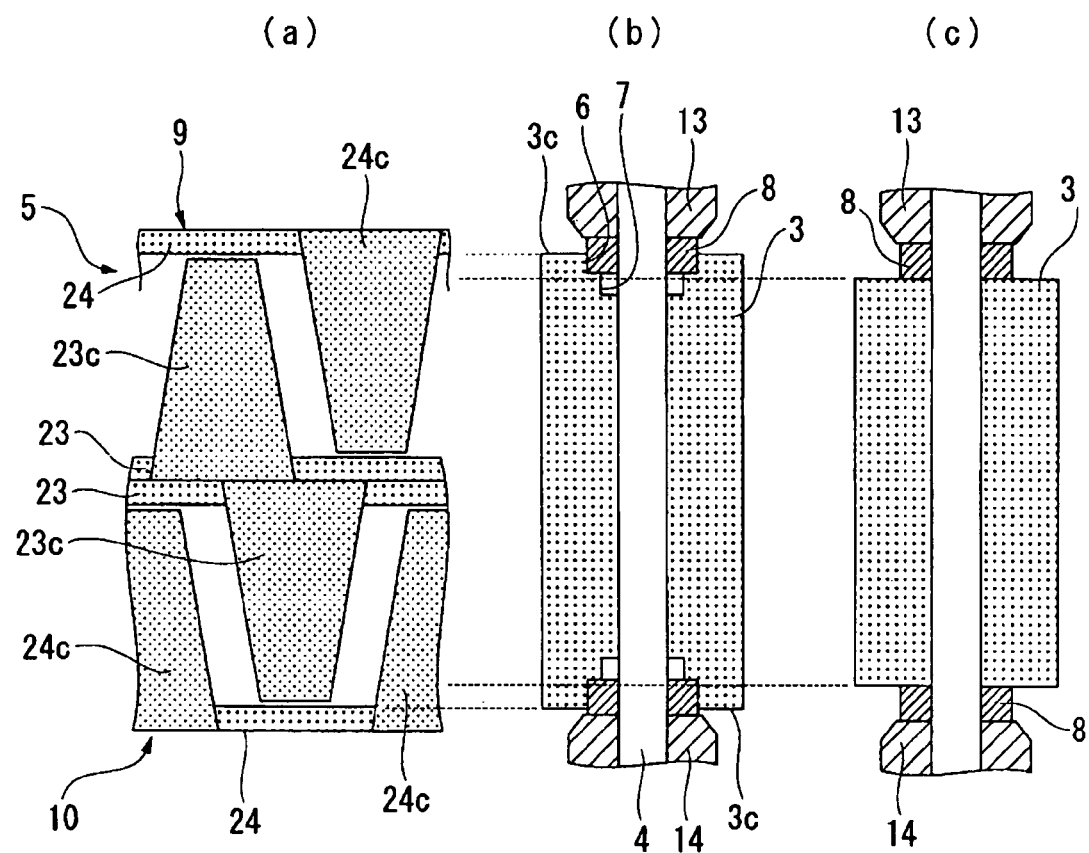
FIG. 5A is a development view of an inner peripheral face of first and second yoke units.
FIG. 5B is a sectional view of a rotor.
FIG. 5C is a sectional view of a rotor in a related art in the stepping motor according to the first embodiment of the invention.

Further, the rotor 3 is formed by a ferromagnetic member of, for example, samarium cobalt, neodymium, iron, boron or the like. Although powders of the ferromagnetic members may be sintered to be finished to the shape of the rotor 3, by mixing the powders to a plastic to be subjected to injection molding, even a complicated shape having a hole or a recessed portion can be fabricated accurately and easily. Further, the permanent magnet 2 is formed by magnetizing the outer peripheral portion 3a. According to the permanent magnet 2, for example, a magnetic pole is divided by 8 in the circumferential direction R and is magnetized such that polarities thereof differ alternately. Further in details, the permanent magnet 2 is magnetized as shown below. That is, as shown by FIG. 4, magnetizing yokes N1 and S1 having different polarities are arranged alternately only in the circumferential direction R in correspondence with numbers and polarities of the magnetic poles to be formed. By constituting in this way, a magnetic field M in an arc shape passing from a surface of the outer peripheral portion 3a to again to the surface by way of an inner portion is formed between the contiguous magnetizing yokes N1, S1 having different polarities, and the outer peripheral portion 3a of the rotor 3 is magnetized such that the polarities differ from each other alternately.

As shown by FIG. 2 and FIG. 3, the stator 5 covering the outer peripheral portion 3a of the rotor 3 is provided with a first yoke unit 9 in a ring-like shape constituting an A phase stator and a second yoke unit 10 in a ring-like shape constituting a B phase stator to overlap in a direction of the axis line L of the rotating shaft 4 to constitute a two phase PM type stepping motor of a claw pole type. Further, the stator 5 is provided with support members 11, 12 substantially in a circular plate shape for pinching the first and the second yoke units 9, 10 from both sides along the direction of the axis line L. The first and the second yoke units 9, 10 and the support members 11, 12 are bonded respectively by welding. Further, positions of the support members 11, 12 in correspondence with the rotating shaft 4 are formed with through holes 11a, 12a, fitted with bearings 13, 14 in a ring-like shape to be fixed thereby. Further, the rotating shaft 4 is supported rotatably by the bearings 13, 14 by inserting the rotating shaft 4 therethrough. Further, here is brought about a state of interposing the sliders 8 between the end portions 3c of the rotor 3 and the bearings 13, 14, and the rotating shaft 4 and the rotor 3 are restricted from being moved in the axis line L direction. Further, oil retaining bearings formed by a sintered metal or resin bearings having excellent slidability are used for the bearings 13, 14. When a resin is used for the bearings, the support members 11, 12 and the bearings 13, 14 can also be molded integrally. Further, when a resin constituting a nonmagnetic material is used, it is possible to design a structure (magnetic circuit) which is not influenced by a magnetic field formed by the permanent magnet 2 of the rotor 3 and the stator 5 mentioned later, and therefore, promotion of a motor efficiency can be expected.

Further, according to the embodiment, both of the first yoke unit 9 and the second yoke unit 10 are constructed by the same constitution. Therefore, here, the first yoke unit 9 will be explained in details. The first unit 9 is for constituting the A phase stator and includes a bobbin 20 as well as an exciting coil 22 constituted by a coil wiring 21 wound around an outer periphery of the bobbin 20, an outer yoke 23 (yoke), and an inner yoke 24 (yoke). The bobbin 20 is formed with a groove portion 20a formed in a ring-like shape by a resin material and capable of winding the coil wiring 21 at an outer peripheral face thereof and formed with a guide groove 20b for respectively guiding magnetic pole teeth (claw pole: dielectric member) 23c, 24c mentioned later of the inner yoke 24 and the outer yoke 23 to align at predetermined positions at an inner peripheral face thereof. Further, an outer periphery of the bobbin 20 is provided with a projected portion 20c projected to an outer side and the projected portion 20c is provided with an external connection terminal 20d made by a metal for connecting a terminal of the coil wiring 21 and electrically connected to an external part, not illustrated, of a circuit part or the like. Further, as shown by FIG. 2, the coil wiring 21 wound around the groove portion 20a of the bobbin 20 is wound to be contained within a depth of the groove portion 20a so as not to be projected to the outer side from the outer periphery of the bobbin 20.

The outer yoke 23 is formed in a cylindrical shape centering on the axis line L with a metal material of a magnetic member such as pure iron or the like and includes an outer cylinder portion 23a capable of containing the exciting coil 22 at inside thereof, a back face portion 23b folded to bend by 90 degrees from an outer edge of one end side of the outer cylinder portion 23a by a predetermined distance to be directed in the direction of the axis line L, and the magnetic pole teeth 23c formed by a plurality thereof folded to bend by 90 degrees from the back face portion 23b by a predetermined distance to be directed in the direction of the axis line L, in a state of being arranged oppositely to the inner peripheral face of the bobbin 20 by being guided by the guide groove 20b of the bobbin 20 to be spaced apart from each other by constant intervals in the circumferential direction R. Further, according to the embodiment, an example is taken by a case of forming the magnetic pole teeth 23c to be aligned by 4 thereof by being spaced apart from each other by constant intervals in the circumferential direction R.

The outer cylinder portion 23a is formed by a size more or less larger than a height and an outer diameter of the exciting coil 22, and an outer edge on other end side thereof is formed with a stepped portion 23d for positioning an inner yoke 24 relative to the direction of the axis line L. Further, a portion of the outer cylinder portion 23a is formed with a notched portion 23e for positioning the inner yoke 24 in the circumferential direction R and positioning the exciting coil 22 in two directions of the axis line L direction and the circumferential direction R by being fitted to the projected portion 20c of the bobbin 20. The positionings will be explained later in details.

The back face portion 23b is folded to bend from the outer edge of the one end side of the outer cylinder portion 23a to the axis line L. That is, the back face portion 23b is folded to bend to provide an interval capable of containing the exciting coil 22 between the outer cylinder portion 23a and the magnetic pole teeth 23c. The magnetic pole teeth 23c are provided to be disposed on an inner side of the outer cylinder portion 23a and a length there of is adjusted such that front ends thereof are disposed at vicinities of the stepped portion 23d. Further, the magnetic pole teeth 23c are provided to narrow widths thereof gradually to the front ends, that is, to constitute a trapezoidal shape. Further, as described above, when the exciting coil 22 is contained between the magnetic pole teeth 23c and the external cylinder portion 23a, the respective magnetic pole teeth 23c are arranged to be opposed to the inner peripheral face of the bobbin 20 while being guided by the guide grooves 20b of the bobbin 20.

Similar to the outer yoke 23, the inner yoke 24 is formed by a metal material of a magnetic member of pure iron or the like and includes a ring member 24a formed in a ring-like shape centering on the axis line L similar to the back face portion 23b, and the magnetic pole teeth 24c folded to bend by 90 degrees from an inner peripheral side of the ring portion 24a in the direction of the axis line L, formed by a plurality thereof by being spaced apart from each other by constant intervals in the circumferential direction R to be arranged to be opposed to the inner peripheral face of the bobbin 20 while being guided by the guide grooves 20b of the bobbin 20 and aligned at equal intervals alternately in the circumferential direction R in a state of not being brought into contact with the magnetic pole teeth 23c of the outer yoke 23.

Further, according to the embodiment, an example is taken by a case of providing the magnetic pole teeth 24c of the inner yoke 24 provided to align by 4 thereof by being spaced apart from each other by constant intervals in the circumferential direction R similar to the magnetic pole teeth 23c of the outer yoke 23. Further, when the inner yoke 24 is combined with the outer yoke 23, the inner yoke 24 is positioned in the direction of the axis line L by bringing the ring portion 24a into contact with the stepped portion 23d of the outer yoke 23. Further, a portion on an outer peripheral side of the ring portion 24a is formed with a projected portion 24b fitted to the notched portion 23e of the outer yoke 23. Thereby, the inner yoke 24 and the outer yoke 23 can be combined in a state of being positioned relative to the circumferential direction R.

Further, the magnetic pole teeth 24c of the inner yoke 24 show a shape substantially equal to that of the magnetic pole teeth 23c of the outer yoke 23. That is, lengths thereof are adjusted such that front ends are disposed at vicinities of the back face portion 23b and the magnetic pole teeth 24c are provided to narrow widths thereof gradually to the front ends to constitute a trapezoidal shape. Further, the respective magnetic pole teeth 24c are arranged to be opposed to the inner peripheral face of the bobbin 20. Further, when the projected portions 24b are fitted to the notched portions 23e, the magnetic pole teeth 24c of the inner yoke 24 are guided by the guide grooves 20b of the bobbin 20 to be brought into intervals of the magnetic pole teeth 23c of the outer yoke 23, that is, such that pitches are shifted from each other. Thereby, when the outer yoke 23 and the inner yoke 24 are combined, the respective magnetic pole teeth 23c, 24c are aligned at equal intervals in a state of being arranged in the axis line L direction alternately in the circumferential direction R in a noncontact state and brought into a state of being opposed to the outer peripheral portion 3a of the rotor 3. The first yoke unit 9 constituting the A phase stator and the second yoke unit 10 constituting the B phase stator constituted in this way are arranged to overlap to each other in a state of bringing the back face portions 23b of the outer yokes 23 into face contact with each other and are bonded each other by welding.

FIG. 5A shows a development view of sides of inner peripheral faces of the first yoke unit 9 and the second yoke unit 10, further, FIG. 5B shows a side view of the rotor 3 in correspondence therewith. As shown by FIG. 5A, the magnetic pole teeth 23c of the outer yoke 23 of the first yoke unit 9 and the magnetic pole teeth 24c of the inner yoke 24 of the second yoke unit 10 are bonded to be shifted from each other by ¼ pitch of the magnetic pole teeth pitch. Further, as shown by FIG. 5B, the rotor 3 is positioned in the axis line L direction by the sliders 8 between the bearings 13, 14, and the rotor 3 and the stator 5 are arranged coaxially and substantially symmetrically in a diameter direction orthogonal to the axis line L direction. Further, the rotor 3 is provided such that the magnetic pole teeth 23c, 24c of the first and the second yoke units 9, 10 are opposed to each other in a range of being arranged in the axis line L direction.

Next, an explanation will be given of operation of the camera attached portable telephone 100 and the mounted stepping motor of the embodiment. Here, an explanation will be given of a case of taking an image in a state of zooming an object, not illustrated, by moving the camera module 104 of the camera attached portable telephone 100 by operating the stepping motor 1 as an example thereof.

First, as shown by FIG. 1, when a user carries out a zooming operation while confirming an object by a display panel, not illustrated, of the camera attached portable telephone 100, a current is made to flow to the respective exciting coils 22 in order to operate the stepping motor 1 by the control portion mounted to the circuit board 114 on the camera module 104. As shown by FIG. 2, when the current is made to flow to the respective exciting coils 22, the respective magnetic pole teeth 23c, 24c of the first and the second yoke units 9, 10 are excited successively to N poles, S poles. Further, a torque around the rotating shaft 4 is generated by the permanent magnet 2 of the rotor 3 by a magnetic field formed by the magnetic pole teeth 23c, 24c to be able to rotate the rotor 3 intermittently in accordance with the pitches of the magnetic pole teeth 23c, 24c. Stated otherwise, torque is generated by interaction between the rotor magnetic field (the permanent magnet 2) and the stator magnetic field (magnetic pole teeth 23c, 24c) at an air gap between the rotor and the stator. In this case, the portions of the sliders 8 which are projected from the first recessed portions 6 are interposed between the bearings 13, 14 and the rotor 3, and the rotor 3 is not brought into direct contact with the bearings 13, 14. Therefore, the rotor 3 can be rotated without being worn by being brought into contact with the bearings 13, 14. Further, the sliders 8 are made to be slidable respectively independently from the rotor 3, the bearings 13, 14 and the rotating shaft 4 at inner portions of the first recessed portion 6. Therefore, the rotor 3 can be rotated by reducing a friction load.

As shown by FIG. 1, also the rotating shaft 4 is rotated around the axis line L in accordance with rotation of the rotor 3, and therefore, the drive gear 122 fixed to the one end side of the rotating shaft 4 is similarly rotated. By rotation of the drive gear 122, the input gear 123b and the output gear 123c of the respective middle gears 123 brought in mesh therewith are rotated centering on the shaft 123a, the speed is reduced to a predetermined revolution number, and the driven gear 120b of the feed screw shaft 120 is rotated. Further, thereby, the screw portion 120a is rotated by a predetermined revolution number around the axis line L2.

Further, the nut portion 116b of the expanded member 116 on one side screwed with the screw portion 120a is moved along the axis line L2 direction in accordance with rotation of the feed screw shaft 120. Thereby, a total of the lens member 101 fixed with the expanded members 116, 117 is moved in the optical axis L1 direction along the pair of guide shafts 118, 119. As a result, the lens R fixed by the lens holder portion 115 can be made to be proximate to the image taking element 103 to be able to carry out zooming. Therefore, a user can take an image in a state of zooming the object. Further, although an explanation has been given of the case of carrying out zooming, by changing a direction of rotating the rotor 3, the lens member 101 can be made to be remote from the image taking element 103 or proximate thereto and focusing can freely be carried out.

Here, when the first recessed portion 6 is not formed in the background art as shown by FIG. 5C, spaces between a rotor 3' and the bearings 13, 14 are determined by a member dimension of the slider 8. However, as shown by FIG. 5B, according to the embodiment, by containing the slider 8 in the first containing recessed portion 6, spaces between the bearings 13, 14 and the end portions 3c of the rotor 3 can be constituted by a minimum size. Therefore, the torque can efficiently be operated to the rotor 3 by the magnetic field formed by the respective magnetic pole teeth 23c, 24c of the stator 5 by maximizing the dimension in the axis line L direction of the rotor 3. Particularly, according to the embodiment, the torque can be operated to the rotor 3 further efficiently by providing the rotor 3 in a range of arranging the magnetic pole teeth 23c, 24c in the axis line L direction.

Further, the stator 5 is constituted by 2 phases of the first yoke unit 9 and the second yoke unit 10, the stator 5 and the rotor 3 are coaxial and substantially symmetrical, further, as described above, the rotor 3 is provided in the range of arranging the magnetic pole teeth 23c, 24c in the axis line L direction. Therefore, an output having a high resolution can be provided, the torque can uniformly be operated to the rotor 3 even by the magnetic field formed by either of the magnetic pole teeth 23c, 24c and a detent torque (residual torque) can be reduced.

Further, the space necessitated by the slider 8 can be minimized, and therefore, a dimension of a total of the stepping motor 1 in the axis line L direction can be constituted by a minimum size. On the other hand, as described above, by containing the slider 8 in the first recessed portion 6, a thickness dimension of the slider 8 necessary in view of a strength thereof and in view of working thereof can be ensured in the axis line L direction in accordance with the depth of the first containing recessed portion 6. Therefore, there can be selected a material which cannot be selected since the thickness necessary in view of the strength cannot be ensured although the material is a material preferable for the slider having a small friction coefficient as in fluororesin. Or, by increasing a degree of freedom in the member dimension, the slider can be fabricated not only by a method of fabricating the slider by punching to work a thin plate but also by injection molding. Therefore, even a material of PEEK (registered trademark) (polyetheretherketone) or the like which has been difficult to be formed by a thin plate, a material of PPS (polyphenylene sulfide) or the like which cannot be selected in view of the strength in punching of the background art or the like can be selected.

Further, although the slider 8 can reduce the friction load by filling the lubricant between the bearings 13, 14 and the rotor 3, by being contained in the slider 8 in the first recessed portion 6, the lubricant is not leaked, operation of reducing the friction load is made to be preferable, further, the slider 8 is made to be durable. Further, according to the embodiment, the second recessed portion 7 functions as a storage of the lubricant, and the friction load can be reduced under further excellent durability. Further, although as described above, the rotating shaft 4 is adhered to be fixed to the rotor 3, even when the adhering agent is leaked, the lubricant is contained by the second recessed portion 7, and therefore, thrust rattle can be prevented from being brought about by interposing the adhering agent between the slider 8 and the rotating shaft 4. Further, by forming the first recessed portion 6 and the second recessed portion 7, an inertia moment of a total of the rotor 3 can be reduced, and therefore, the motor torque can further efficiently be outputted by a torque operated by the stator 5. Further, a contact area of the slider 8 and the rotor 3 can be reduced by the second recessed portion 7, and therefore, the friction load can further be reduced.

Further, the stepping motor 1 of the embodiment is of the PM type, the rotor 3 includes the permanent magnet 2 as the magnet. Therefore, an increase in the motor torque can further be achieved by increasing a magnetic flux intensity. In this case, the permanent magnet 2 of the rotor 3 is magnetized by alternately aligning the magnetizing yokes N1, S1 having different magnetic poles to surround the outer peripheral portion 3a and it is not necessary to magnetize the magnet by arranging the magnetized yokes on an inner side of the rotor 3. Therefore, a space for providing the magnetizing yoke is not needed at inside of the rotor 3, and small-sized formation in the diameter direction of the rotor 3 can be achieved. Further, by arranging the magnetizing yokes only at the outer peripheral portion 3a, a number of the magnetizing yokes can be arranged and an output having a high resolution can be achieved by forming a number of the magnetic poles. Further, a portion of the rotor 3 which is magnetized is the outer peripheral portion 3a, and a center portion thereof is not magnetized. Therefore, even when the first recessed portion 6 and the second recessed portion 7 are formed, a magnetic force of the rotor 3 is not reduced and an effect by the first recessed portion 6 and the second recessed portion 7 can be made to be further preferable.

As described above, according to the stepping motor 1 of the embodiment, an increase in the motor torque is achieved by operating the torque efficiently to the rotor by the stator while preventing an increase in the friction load by the first recessed portion 6 and the slider 8 to be able to provide the stepping motor 1 with a high output and a high resolution. Further, small-sized formation of the total of the apparatus can be achieved. Further, according to the camera attached portable telephone 110, by providing such a stepping motor 1, high output formation can be achieved, further, small-sized formation of the total of the apparatus can be achieved by reducing the space of mounting the stepping motor 1. Further, an output having the high resolution can be provided as described above, the detent torque can further be reduced, and therefor, focusing and zooming or the like can further be made to be still and smooth, further, operated by the high output.

Second Embodiment

Figure 6:
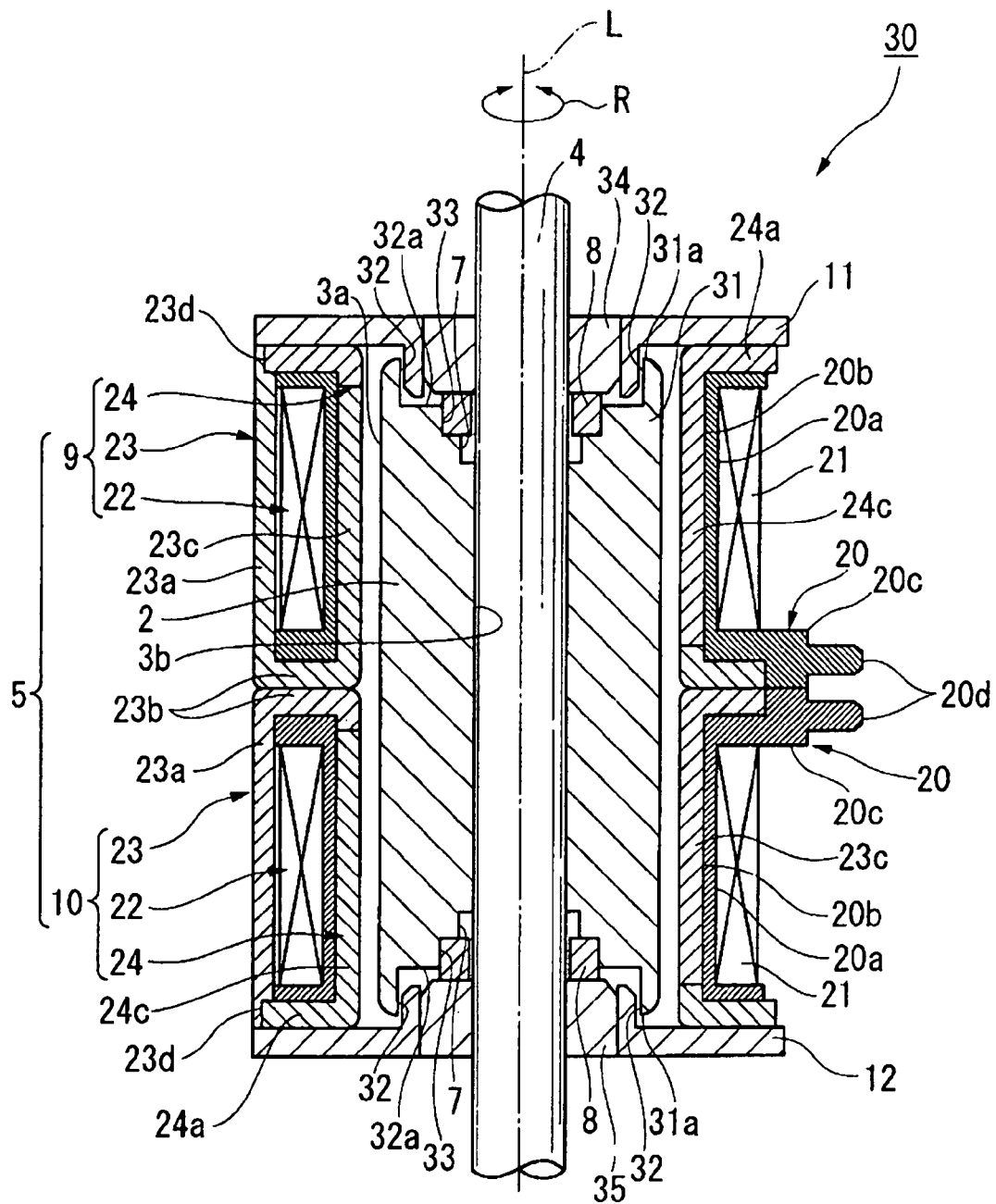
FIG. 6 is a sectional view of a stepping motor according to a second embodiment of the invention.

FIG. 6 shows a second embodiment according to the invention. In the embodiment, members common to the members used in the above-described embodiment are attached with the same notations and an explanation thereof will be omitted.

As shown by FIG. 6, a rotor 31 of a stepping motor 30 of the embodiment is formed with a third recessed portion 32 coaxially with the through hole 3b at an end portion 31a. Further, a first recessed portion 33 for containing the slider 8 is formed on a bottom portion 32a of the third recessed portion 32. Further, portions in the axis line L direction of the bearings 34, 35 fixed to the support members 11, 12 are respectively projected to a side of the rotor 3, contained in the third recessed portion 32 and brought into contact with the slider 8 at inner portions of the third recessed portion 32. The third recessed portion 32 is set to an inner diameter capable of containing portions of the bearings 34, 35 and the support members 11, 12 with clearances therebetween.

According to the stepping motor 30 of the embodiment, by containing portions of the bearings 34, 35 to the third recessed portion 32, a member dimension in the axis line L direction of the rotor 31 can be determined without being restricted by member dimensions of the bearings 34, 35 and the slider 8. That is, spaces for providing the sliders 8 between the bearings 34, 35 and the end portions 31a of the rotor 31 are substantially dispensed with, further, also clearances between the support members 11, 12 for supporting the bearings 34, 35 and the end portions 31a of the rotor 31 can be made to be as small as possible. Further, it is not necessary to project the bearings 34, 35 to outer sides in the axis line L direction of the support members 11, 12. Therefore, small-sized formation of the total of the apparatus in the axis line L direction can further be achieved, and the torque can further efficiently be operated to the rotor 3. Further, by forming the third recessed portion 32, the inertia moment of the rotor 31 can further be reduced and the rotor 31 can further efficiently be rotated.

Third Embodiment

Figure 7:
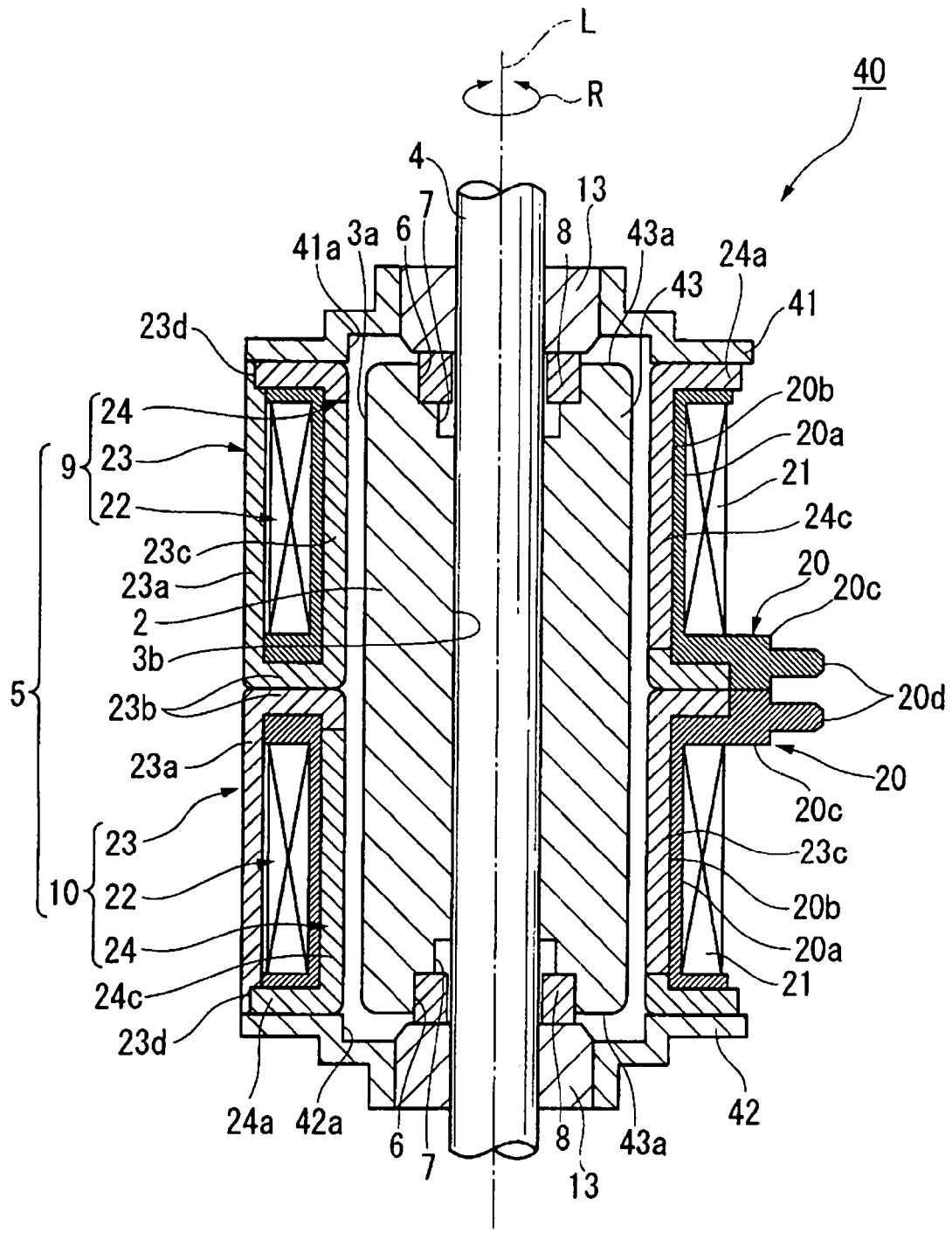
FIG. 7 is a sectional view of a stepping motor according to a third embodiment of the invention.
Figure 8:
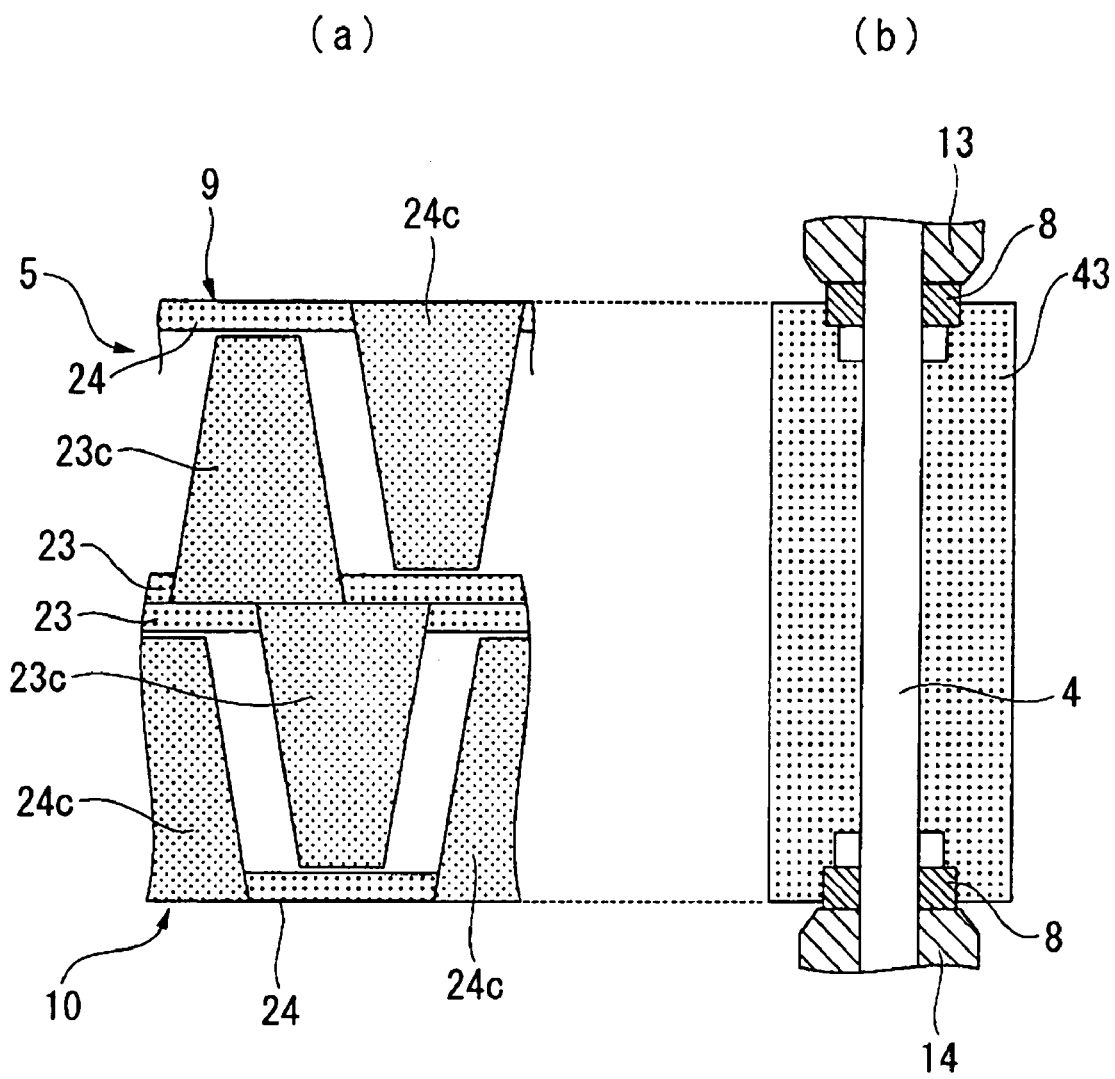
FIG. 8A is a development view of inner peripheral faces of first and second yoke units.
FIG. 8B is a sectional view of a rotor in the stepping motor according to the third embodiment of the invention.

FIG. 7 and FIG. 8 show a third embodiment according to the invention. In the embodiment, members common to the members used in the above-described embodiments are attached with the same notations and an explanation thereof will be omitted.

As shown by FIG. 7, according to a stepping motor 40 of the embodiment, support members 41, 42 for interposing to fix the first and the second yoke units 9, 10 are formed with recessed portions 41a, 42a in correspondence with an outer diameter of a rotor 43 at positions thereof opposed to the rotor 43. Therefore, a member dimension in the axis line L direction of the rotor 43 can be increased in accordance with spaces formed by the recessed portions 41a, 42a. Therefore, positions of end portions 43a of the rotor 43 substantially coincide with positions of the both ends of the first yoke unit 9 and the second yoke unit 10 and the yokes 23, 24 are provided in a range of being arranged in the axis line L direction. Therefore, the torque can be operated to the rotor 43 further efficiently. Further, the detent torque can further be reduced, an increase in the motor torque, low vibration, low noise formation can further be achieved.

Fourth Embodiment

Figure 9:
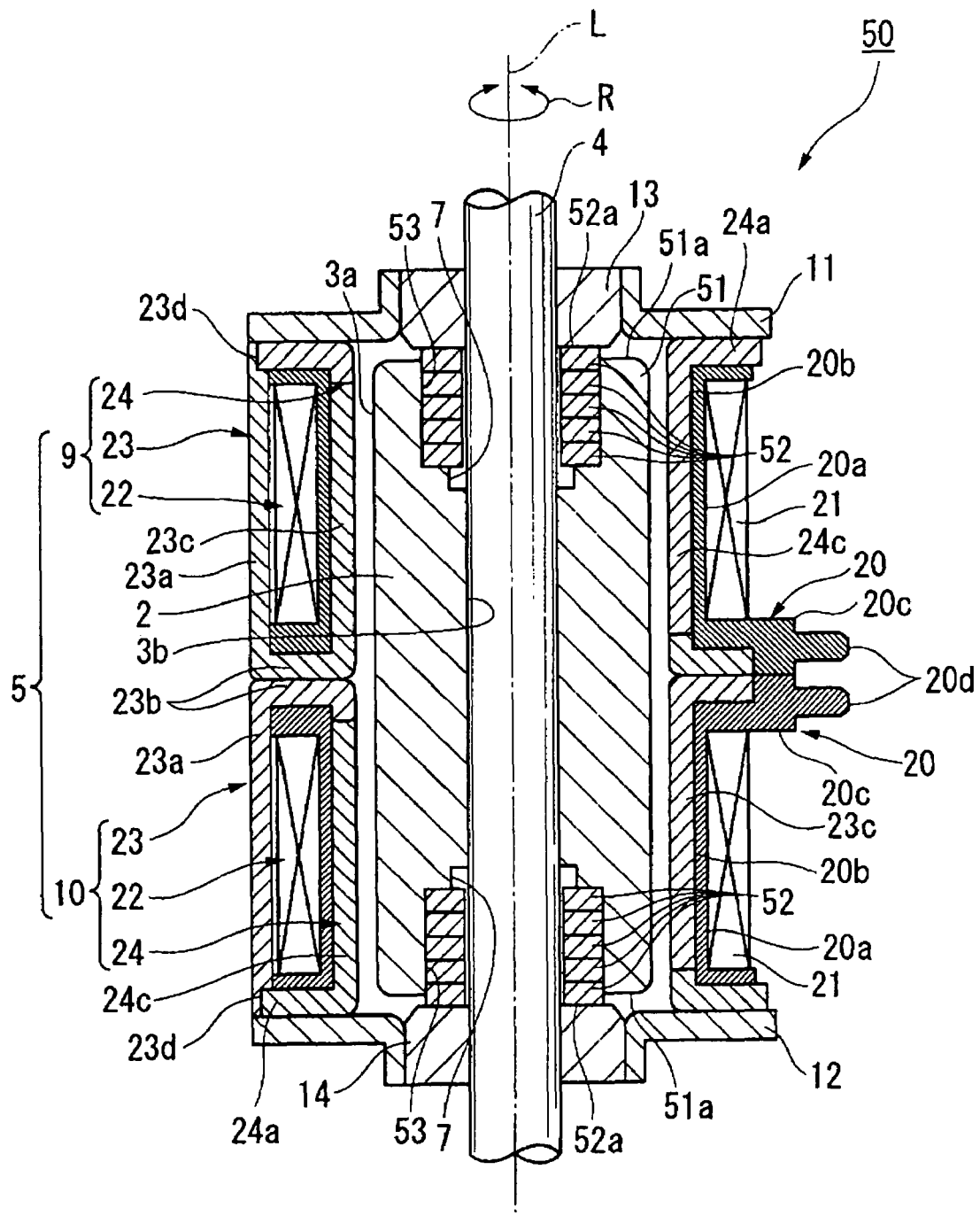
FIG. 9 is a sectional view of a stepping motor according to a fourth embodiment of the invention.

FIG. 9 shows a fourth embodiment according to the invention. In the embodiment, members common to the members used in the above-described embodiments are attached with the same notations and an explanation thereof will be omitted.

As shown by FIG. 9, according to the stepping motor 50 of the embodiment, a plurality of sliders 52 are arranged in the axis line L direction between both end portions 51a and the bearings 13, 14. A first recessed portion 53 for containing the sliders 52 is provided with a depth in accordance with a number of sheets of the sliders 52 and only portions of the sliders 52a disposed on the outermost side of in the axis line L direction are projected to outer sides to be respectively brought into contact with the bearings 13, 14.

According to the stepping motor 50, the respective sliders 52 are slid around the rotating shaft 4 respectively independently from each other between the bearings 13, 14 and a rotor 51. Therefore, the friction load can further be reduced, stick slip among the slider 52, the bearings 13, 14 and the rotor 51 can be restrained from being brought about, which amounts to not only a reduction in a variation of the torque but also to a reduction in an error of a stopping position. Further, by containing the sliders 52 in the first recessed portion 53, the stepping motor 50 is not large-sized in the axis line L direction by making the sliders 52 plural.

Although a detailed description has been given in the embodiments of the invention in reference to the drawings as described above, a specific constitution is not limited to the embodiments but includes a design change or the like within the range not deviated from the gist of the invention.

Further, although according to the embodiment, as the electric motor, an example is taken by the 2 phase PM type stepping motor 1 of the claw pole type, the electric motor is not limited thereto. In the stepping motor, for example, the stepping motor may be constituted by a VR type. Further, the electric motor is not limited to the stepping motor but, for example, constituted by a brushless motor. So far as the electric motor is at least an electric motor for driving to rotate the rotor by operating the torque thereto by the magnetic field formed by the stator, by constructing a constitution of containing at least a portion of the slider by forming the first recessed portion at the rotor, similarly, an efficient and small-sized electric motor can be provided. Further, although an explanation has been given by taking an example of the camera attached portable telephone 100 as the electronic apparatus for mounting the electric motor, the electronic apparatus is not limited to the case. For example, the electronic apparatus may be a digital camera or the like. Further, the invention is preferable also for adjusting a pick up lens in a DVD player. Further, although there is constructed the constitution of constituting the number of the magnetic poles of the rotor by 8 and providing fours of the magnetic pole teeth of the respective yoke units, the invention is not limited to the case but the number of the magnetic poles of the rotor may pertinently be changed to 4, 6 or 10 or the like, and the number of the magnetic teeth of the yoke may pertinently be changed to 2, 3 or 5 or the like. Further, although the yoke unit is constituted by 2 phases, the invention is not limited thereto but the yoke unit may be constructed by a constitution of single phase or 3 or more phases.

What is claimed is:

1. An electric motor comprising:
   a rotor having a permanent magnet that is substantially cylindrical in shape, the rotor having an axial through-hole and an end portion formed with a first recessed portion, a bottom portion of the first recessed portion being formed with a second recessed portion having an inner diameter smaller than that of the first recessed portion and larger than that of the axial through-hole;
   a rotational shaft extending through the axial through-hole and mounted to the rotor along a center of rotation of the rotor for rotation therewith;
   a stator that covers an outer peripheral portion of the rotor and that forms a magnetic field that interacts with a magnetic field of the permanent magnet to generate a torque around the rotational shaft to thereby rotate the rotational shaft and the rotor;
   a bearing for rotatably supporting the rotational shaft, the bearing being entirely spaced-apart from the end portion of the rotor;
   a slider that is substantially plate-like in shape and that is slidably mounted around the rotational shaft and supports rotation of the rotational shaft about a rotational axis thereof, the slider being interposed between the bearing and the end portion of the rotor and having a portion that extends into the first recessed portion of the rotor in an axis line direction of the rotational shaft so as to contact the bottom portion of the first recessed portion and not extend into the second recessed portion formed in the bottom portion of the first recessed portion, the second recessed portion forming a space between the rotor and the portion of the slider to thereby reduce a contact area between the slider and the rotor; and
   a lubricant stored in the second recessed portion formed in the bottom portion of the first recessed portion and filled between the rotor and the portion of the slider that extends into the first recessed portion.

2. An electric motor comprising:
   a rotor having a permanent magnet and an end portion formed with a first recessed portion, a second recessed portion contiguous with a bottom portion of the first recessed portion, and a third recessed portion contiguous with the first recessed portion so that the first recessed portion is between the second and third recessed portions;
   a rotational shaft mounted to the rotor;
   a stator that covers an outer peripheral portion of the rotor and that forms a magnetic field that interacts with a magnetic field of the permanent magnet to generate a torque around the rotational shaft to thereby rotate the rotational shaft and the rotor;
   a bearing that rotatably supports the rotational shaft, the bearing having a portion extending into the third recessed portion with a clearance between the portion of the bearing and the rotor; and
   a slider slidably mounted around the rotational shaft and supporting rotation of the rotational shaft about a rotational axis thereof, the slider having a portion contained in the first recessed portion and in contact with the bottom portion thereof and a remaining portion extending into the third recessed portion and in contact with the bearing.

3. An electric motor according to claim 1; wherein the slider comprises a first slider; and further comprising a plurality of second sliders each having a substantially plate-like shape, being slidably mounted around the rotational shaft and supporting the rotation of the rotational shaft about the rotational axis thereof, and being disposed entirely within the first recessed portion of the rotor in the axis line direction of the rotational shaft.

4. An electric motor according to claim 3; wherein the permanent magnet is formed of a ferromagnetic material and multipole magnetized in a circumferential direction of an outer peripheral portion thereof; and wherein the electric motor is a stepping motor and the rotor undergoes intermittent rotation.

5. An electric motor according to claim 4; wherein the permanent magnet is multipole magnetized by magnetizing yokes having different polarities and alternately arranged in the circumferential direction so as to surround the outer peripheral portion of the magnet.

6. An electric motor according to claim 4; wherein the stator comprises a plurality of yokes aligned in the axis line direction of the rotational shaft.

7. An electric motor according to claim 4; wherein the stator comprises a yoke having a plurality of magnetic pole teeth aligned in the axis line direction of the rotational shaft for forming a magnetic field in the circumferential direction of the magnet; and wherein the rotor is disposed opposite to the magnetic pole teeth of the yoke.

8. An electric motor according to claim 7; wherein the rotor is disposed in opposite and confronting relation to the yoke.

9. An electronic apparatus comprising the electric motor according to claim 1.

10. An electronic apparatus comprising:
    an electric motor comprised of (a) a rotor that has a permanent magnet that is substantially cylindrical in shape, the rotor having an end portion formed with a first recessed portion, a bottom portion of the first recessed portion being formed with a second recessed portion; (b) a rotational shaft mounted to the rotor along a center of rotation of the rotor for rotation therewith; (c) a stator that covers an outer peripheral portion of the rotor and that forms a magnetic field that interacts with a magnetic field of the permanent magnet to generate a torque around the rotational shaft to thereby rotate the rotational shaft and the rotor; (d) a bearing for rotatably supporting the rotational shaft, the bearing being entirely spaced-apart from the end portion of the rotor;

(e) a slider that is substantially plate-like in shape and that is slidably mounted around the rotational shaft and supports rotation of the rotational shaft about a rotational axis thereof, the slider being interposed between the bearing and the end portion of the rotor and having a portion that extends into the first recessed portion of the rotor in an axis line direction of the rotational shaft so as to contact the bottom portion of the first recessed portion and not extend into the second recessed portion formed in the bottom portion of the first recessed portion, the second recessed portion forming a space between the rotor and the portion of the slider to thereby reduce a contact area between the slider and the rotor; and (f) a lubricant stored in the second recessed portion formed in the bottom portion of the first recessed portion and filled between the rotor and the portion of the slider that extends into the first recessed portion;

a lens member arranged movably along an optical axis;

lens driving means for moving the lens member along the optical axis in accordance with rotation of the rotor of the electric motor; and a camera module having an image taking element arranged on the optical axis.

11. An electric motor according to claim 1; wherein the permanent magnet is formed of a ferromagnetic material and multipole magnetized in a circumferential direction of an outer peripheral portion thereof; and wherein the electric motor is a stepping motor and the rotor undergoes intermittent rotation.

12. An electric motor according to claim 11; wherein the permanent magnet is multipole magnetized by magnetizing yokes having different polarities and alternately arranged in the circumferential direction so as to surround the outer peripheral portion of the magnet.

13. An electric motor according to claim 12; wherein the stator comprises a plurality of yokes aligned in the axis line direction of the rotational shaft.

14. An electric motor according to claim 13; wherein the stator comprises a yoke having a plurality of magnetic pole teeth aligned in the axis line direction of the rotational shaft for forming a magnetic field in the circumferential direction of the magnet; and wherein the rotor is disposed opposite to the magnetic pole teeth of the yoke.

15. An electric motor according to claim 11; wherein the stator comprises a yoke having a plurality of magnetic pole teeth aligned in the axis line direction of the rotational shaft for forming a magnetic field in the circumferential direction of the magnet; and wherein the rotor is disposed opposite to the magnetic pole teeth of the yoke.

16. An electric motor according to claim 1; wherein the rotational shaft is adhered to the rotor using an adhering agent; and wherein during a leaking condition of the adhering agent, the lubricant stored in the second recessed portion prevents the adhering agent from being interposed between confronting portions of the slider and the rotational shaft.

17. An electric motor according to claim 1; wherein a dimension of the slider in the axis line direction of the rotational shaft is larger than a depth of the first recessed portion so that the portion of the slider is contained in the first recessed portion in contact with the bottom portion thereof and another portion of the slider extends from the first recessed portion and is disposed in contact with the bearing.

18. An electric motor comprising:

a rotor having a permanent magnet and an end portion formed with a first recessed portion, a bottom portion of the first recessed portion being formed with a second recessed portion;

a rotational shaft mounted to the rotor;

a stator that covers an outer peripheral portion of the rotor and that forms a magnetic field that interacts with a magnetic field of the permanent magnet to generate a torque around the rotational shaft to thereby rotate the rotational shaft and the rotor;

a bearing that rotatably supports the rotational shaft, the bearing being entirely spaced-apart from the end portion of the rotor in an axial direction of the rotational shaft; and a slider slidably mounted around the rotational shaft and supporting rotation of the rotational shaft about a rotational axis thereof, the slider being interposed between the bearing and the rotor so that a portion of the slider is entirely contained in the first recessed portion and in contact with the bottom portion thereof and the remaining portion of the slider is disposed in the space between the bearing and the rotor and in contact with the bearing.

19. An electric motor according to claim 18; wherein the second recessed portion formed in the bottom portion of the first recessed portion stores a lubricant that is filled between the rotor and the portion of the slider that is contained in the first recessed portion.

20. An electric motor according to claim 2;

further comprising a lubricant stored in the second recessed portion and filled between the rotor and the portion of the slider that extends into the first recessed portion.

* * * * *